United States Patent [19]

Battle

[11] Patent Number: 5,463,187
[45] Date of Patent: Oct. 31, 1995

[54] FLEXIBLE MULTI-DUCT CONDUIT ASSEMBLY

[75] Inventor: Mark Battle, Stone Mountain, Ga.

[73] Assignee: The George Ingraham Corp., Stone Mountain, Ga.

[21] Appl. No.: 267,836

[22] Filed: Jun. 28, 1994

Related U.S. Application Data

[63] Continuation of Ser. No. 953,862, Sep. 30, 1992, abandoned.

[51] Int. Cl.$^6$ ................................................ F16L 39/00
[52] U.S. Cl. .................. 174/88 R; 138/111; 138/155; 285/133.1; 285/137.1
[58] Field of Search ...................... 174/88 R, 88 C, 174/65 R; 138/111, 112, 120, 155; 285/137.1, 133.1, 921, 331, 345

[56] References Cited

U.S. PATENT DOCUMENTS

| | | | |
|---|---|---|---|
| 3,859,455 | 1/1975 | Gommans et al. | 174/88 C |
| 4,362,187 | 12/1982 | Harris et al. | 138/122 X |
| 4,702,502 | 10/1987 | Shade et al. | 285/345 X |
| 4,834,825 | 5/1989 | Adams et al. | 138/111 X |
| 5,078,432 | 1/1992 | Seiter | 285/137.1 X |
| 5,135,265 | 8/1992 | Bouscher et al. | 138/112 X |

Primary Examiner—Timothy V. Eley
Assistant Examiner—Khan V. Nguyen
Attorney, Agent, or Firm—Hopkins & Thomas

[57] ABSTRACT

An improved flexible multi-duct conduit system for housing and protecting subterranean fiber-optic cable comprises matable sections each having an outer casing and a plurality of inner ducts for carrying the cable. An rubberized inner duct coupler is provided at one end of each section for aligning and sealing the inner ducts of adjacent sections when the sections are joined together end-to-end. An outer casing coupler for coupling and sealing the outer casings of adjacent joined sections comprises a cylindrical collar that extends around the ends of two adjacent sections. Sealing gaskets disposed between the outer casing ends and the collar insure against ingress of moisture and other corrosive subterranean elements into the outer casings. The inner ducts are bendable and the outer casings are formed with corrugated exterior surfaces so that the entire system, when assembled in the field, can be bent about an arc to accommodate turns and the like. The inner duct coupler is configured to accommodate relative movement of aligned inner duct ends as the entire system is bent about an arc. The need for specially formed and expensive bends and other shaped sections is thus eliminated.

7 Claims, 3 Drawing Sheets

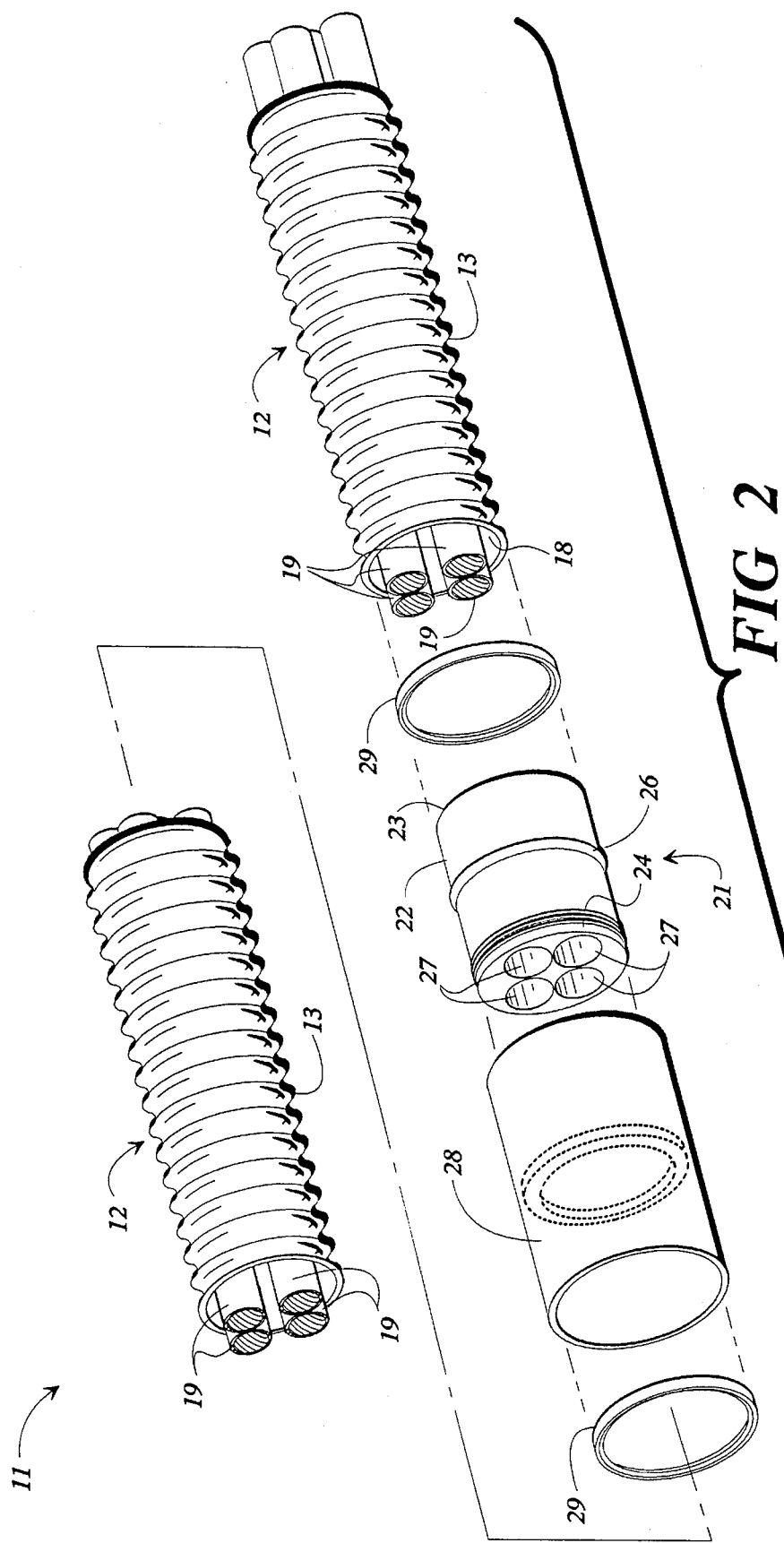

FLEXIBLE MULTI-DUCT CONDUIT ASSEMBLY

This is a continuation of application Ser. No. 07/953,862 filed on Sep. 30, 1992, abandoned.

TECHNICAL FIELD

This invention relates generally to underground telecommunications transmission lines and more specifically to multi-duct conduit assemblies for housing such transmission lines and protecting them from subterranean moisture and other corrosive elements.

BACKGROUND OF THE INVENTION

For many years, telecommunications lines such as copper strand telephone cable was extended between locations on above ground telephone poles. While this provided convenient access for line repair and for the addition of new lines to service expanding populations, it nevertheless exposed the lines to progressive deterioration from weather, sunlight, temperature changes, and vandalism. In addition, many consider above ground cables and telephone poles to be unsightly and would prefer that they be buried in underground trenches. However, due in part to the need for periodic maintenance and addition of new lines, and to the size of conventional copper cables, subterranean telecommunications lines proved to be impractical for many years.

Fortunately, the relatively recent development and widespread use of fiber-optic cable technology has provided the capability to transmit vast amounts of information simultaneously along a single fiber-optic strand. One advantage of such technology is that since many independent transmissions can be carried simultaneously on each fiber-optic strand of a multi-strand cable, expansion of telecommunications service can be provided without adding a correspondingly expanding number of new cables. In addition, a fiber-optic cable is reliable and can be orders of magnitude smaller in diameter that a copper cable of comparable capacity. Accordingly, fiber-optic telecommunications cable is uniquely suited for subterranean installation and commonly is so installed.

When installed under the ground, fiber-optic cable must be protected against moisture, kinks, dirt, and other corrosive elements. To provide such protection, the telecommunications industry has developed a variety of systems commonly known as multi-duct fiber-optic conduit. Such systems typically comprise an extended length of conduit that is installed in trenches extending between spaced man holes and covered with dirt. The conduit has an outer casing of PVC plastic pipe or other corrosion resistant material and a plurality of plastic inner ducts disposed in and extending along the length of the outer casing. Each inner duct is sized to house one or more fiber-optic cables. The inner ducts serve to separate cables and to prevent them from bunching or tangling as they are drawn through the conduit system.

Multi-duct conduit of the type described usually is provided in rectilinear twenty foot sections that can be joined together end-to-end in the field to form a continuous length of conduit. Each section is preassembled at a manufacturing facility with its inner ducts in place within their outer protective casing. The sections generally are provided with a female end and a male end. The female end of each section is configured to receive and couple to the male end of a like section for joining the twenty foot sections together in end-to-end relationship.

An inner duct coupling device typically is provided in the female end of each section for coupling, aligning, and sealing abutting ends of the inner ducts of two sections as the sections are joined together. Such coupling devices commonly comprise a coupling body having a plurality of longitudinally extending bores or sockets sized to receive the ends of the inner ducts as two adjacent conduit sections are joined in the field. Sealing means is provided in the bores for sealing the inner ducts at their junctions to prevent seepage of water into the ducts and escape of air from the ducts when plugs and pulling tape are pressure propelled therethrough. Some coupling devices also seal against the interior walls of adjacent joined outer casings in an effort to prevent ground water leakage into the outer casings. Examples of multi-duct conduit assemblies for use with fiber-optic cable are disclosed in U.S. Pat. Nos. 4,834,825 and 5,078,432.

While multi-duct conduit systems have proven somewhat successful in providing protection for subterranean fiber-optic transmission lines, they nevertheless have been plagued with numerous problems and shortcomings inherent in their respective designs. For example, since the protective outer casings of such systems are rigid in order to provide the necessary strength, they cannot be bent around corners to accommodate turns at road intersections and the like. Accordingly, a large variety of prefabricated bends and other specially shaped conduit sections usually must be purchased by an installing contractor and in many instances custom bends must be ordered to accommodate a particular need. Unfortunately, such specially shaped sections typically must be fabricated by hand and can be very expensive in comparison to a straight twenty foot conduit section. Further, the requirement of special bends and the like also necessitates careful and highly time consuming planning in advance to insure that the proper type and numbers of such bends are pre-ordered and available for installation at a job site.

In addition to problems related to bends, the coupling devices for connecting together and sealing adjacent conduit sections in some prior art multi-duct systems have not proven entirely successful in sealing the system against the intrusion of ground water and other corrosive elements. For example, in systems where the outer casing seal is provided between the inner duct coupler body and the interior walls of adjacent outer casings, water can migrate into the small space between the outer casings and the coupler body behind the seals where it can deteriorate the coupler body itself thus breaching the integrity of the seal. In some instances, the seals themselves can be deformed or damaged when the sections are joined thus allowing ground water to seep into the system.

It can thus be seen that there exists a continuing and heretofore unaddressed need for a subterranean multi-duct fiber-optic conduit system that seals reliably and effectively against intrusion of ground water and other corrosive elements into any part of the system and that eliminates the need for expensive and inefficient bends and other specially shaped manually fabricated sections. It is to the provision of such a conduit system that the present invention is primarily directed.

SUMMARY OF THE INVENTION

Briefly described, the present invention comprises a flexible multi-duct conduit system for housing and protecting subterranean communication lines and particularly fiber-optic cables. The conduit system is made up of twenty foot conduit sections adapted to be joined end-to-end with each section having a plastic outer protective casing that houses a plurality of cable-bearing inner ducts. The outer casing of each section is formed with a circumferentially corrugated exterior surface in conjunction with a smooth interior surface. With this configuration, the outer casing is highly resistant to crushing forces but is also flexible and can readily be bent to follow an arc as small as ten feet in radius, which is typical of arcs encountered in the field when extending multi-duct conduit around corners and the like. The inner ducts of each section can be fabricated of PVC plastic but preferably are formed of polyethylene and have diameters and wall thicknesses that render them flexible as well so that they also can bend about an arc along with their outer casing.

In the field, sections of the multi-duct conduit system are joined together end-to-end and placed in a trench to form an extended length of subterranean conduits through the inner ducts of which fiber-optic cable can subsequently be drawn. To facilitate joining of the sections, one end of each section is provided with an inner duct coupler adapted to couple, align, and seal the inner ducts of two joined sections, and an outer casing coupler that securely couples and seals the outer casings of the two joined sections.

The inner duct coupler of each conduit section preferably is formed from a unitary molded piece of rubberized material such as Santoprene Thermoplastic Rubber from Montsanto and comprises a generally cylindrical coupler body having a plurality of longitudinal bores formed therethrough. The coupler body is sized to fit into the ends of adjacent joined conduit sections with the inner ducts of the sections extending into corresponding ones of the coupler's longitudinal bores. In this way, each inner duct of a section is aligned through a bore with a corresponding inner duct of an adjacent section when the two sections are joined together. The longitudinal bores are sized and configured to seal against inner ducts disposed therein to prevent intrusion of water into the inner ducts at their junctions and to prevent the escape of air when projectiles and puller tape are blown with air pressure through the inner ducts in preparation for drawing fiber-optic cable through the ducts.

The outer casing coupler comprises a generally cylindrical collar that extends about the ends of two joined sections spanning the junction therebetween. An annular rubberized sealing gasket is disposed between the collar and the exterior surface of each outer casing to seal the outer casings against intrusion of subterranean moisture and other corrosive elements. The sealing gaskets are configured to nestle between two adjacent ridges of the corrugated exterior surface of the outer casings to secure the gaskets in place and insure a reliable seal between the outer casings and the coupling collars. Preferably, each twenty foot conduit section is pre-fabricated with an inner duct coupler and an outer casing coupler installed at a female end thereof with the inner ducts of the section seated within the bores of the inner duct coupler. In this way, successive conduit sections can be joined together easily by inserting the male end of each section into the female end of another section.

When installing the conduit system of this invention in the field, typically a trench is dug in the ground extending between spaced man holes and an extended length of multi-duct is assembled alongside the trench by joining twenty foot sections together. The conduit system is then simply rolled into the trench where a projectile and puller tape is blown with compressed air through each inner duct and fiber-optic cable is drawn through the ducts with the puller tape.

When encountering a turn in the trench, the conduit system of this invention is simply bent manually about an arc conforming to that of the turn and lowered into the trench. As the conduit bends, the rigid cylindrical collars of the outer casing couplers in conjunction with the inner duct couplers, which are wedged tightly within the ends of abutting outer casings and are surrounded by the outer casing couplers, tend to retain the multi-duct conduit in a rectilinear configuration at and just to either side of the junctions between adjacent sections. This prevents flexing of the system in the immediate regions of the junctions where the couplers are disposed and thus prevents the inner duct couplers from being deformed as the conduit bends. The integrity of seals between the inner ducts and the bores of the inner duct couplers is therefore maintained.

In addition, each inner duct coupler couples the inner ducts of two adjacent sections with a space or expansion region between the ends of each pair of abutting inner ducts. In this way, the inner duct ends are free to shift slightly relative to each other within the bores of their inner duct couplers as the conduit is bent about an arc. Such relative shifting of the inner duct ends is necessary since, as the system is bent, the outermost inner ducts follow an arc of slightly larger radius and thus slightly larger circumference than the innermost inner ducts. Accordingly, as the system bends, the inner duct ends on the outside of the arc move slightly apart within the couplers and those on the inside of the arc move slightly together. The slightly different lengths of the inside and outside circumferences of the arc are thus accommodated.

When fully installed and covered with dirt, the sealing gaskets of the outer duct couplers prevent migration of water and other corrosive elements into any portion of the outer casings while the inner bores seal the inner ducts against such elements and against escape of air during the blowing process. Independent and reliable double seals are thus provided to protect the fiber-optic cable within the inner ducts of the system.

It is thus an object of this invention to provide a multi-duct conduit system for subterranean cables that reliably protects the cables against corrosive elements under the ground.

Another object of the invention is to provide a flexible fiber-optic multi-duct conduit system that eliminates the need for specially formed bends and other custom shaped conduit sections to accommodate turns and the like encountered during installation.

A further object of the invention is to provide an improved multi-duct conduit system that is easily and reliably assembled in the field.

A still further object of the invention is to provide a multi-duct conduit system that prevents migration of moisture and other corrosive elements into the space between the outer casings and the inner duct couplers.

An additional object of the invention is to provide an improved multi-duct system for underground telecommunications cable that is economical to produce and transport and that provides reliable long term protection for underground fiber-optic and other cable.

Another object of the invention is to provide a flexible multi-duct wherein the integrity of junction seals is maintained as the conduit is bent about an arc and wherein the inner ducts can shift longitudinally relative to abutting inner ducts to accommodate the bending process.

These and other objects, features, and advantages of this invention will become more apparent upon review of the detailed description set forth below taken in conjunction with the following briefly described drawing figures.

BRIEF DESCRIPTION OF THE DRAWINGS

FIG. 2 is a perspective exploded view of the multi-duct conduit system illustrated in FIG. 1.

FIG. 4 is a plan view of the multi-duct conduit system of this inventing showing its flexibility to accommodate turns and the like.

DETAILED DESCRIPTION OF THE PREFERRED EMBODIMENT

Figure 1:
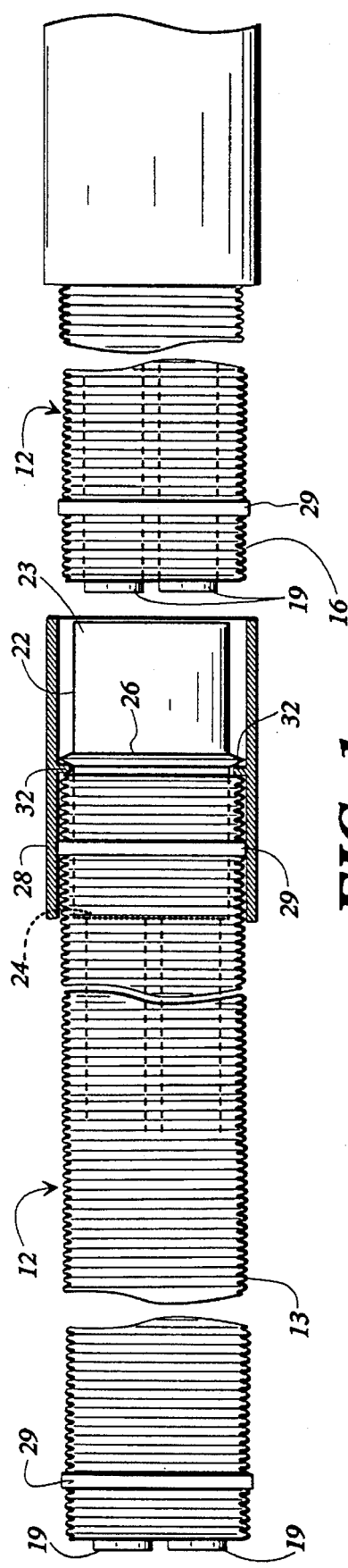
FIG. 1 is a side elevational exploded view, partially in section, showing a multi-duct conduit system that embodies principles of this invention in a preferred form.

Referring now in more detail to the drawings, in which like numerals refer to like parts throughout the several views, FIG. 1 illustrates a flexible multi-duct conduit system that embodies principles of the present invention in a preferred form. The system 11 is formed of like conduit sections 12 that are adapted to be joined together end-to-end to form a multi-duct conduit assembly of extended length. Each of the sections 12 preferably is prefabricated as a unit and is approximately 20 feet long to facilitate convenient storage and transport. Obviously, however, sections of length other than twenty feet may also be provided.

Figure 3:
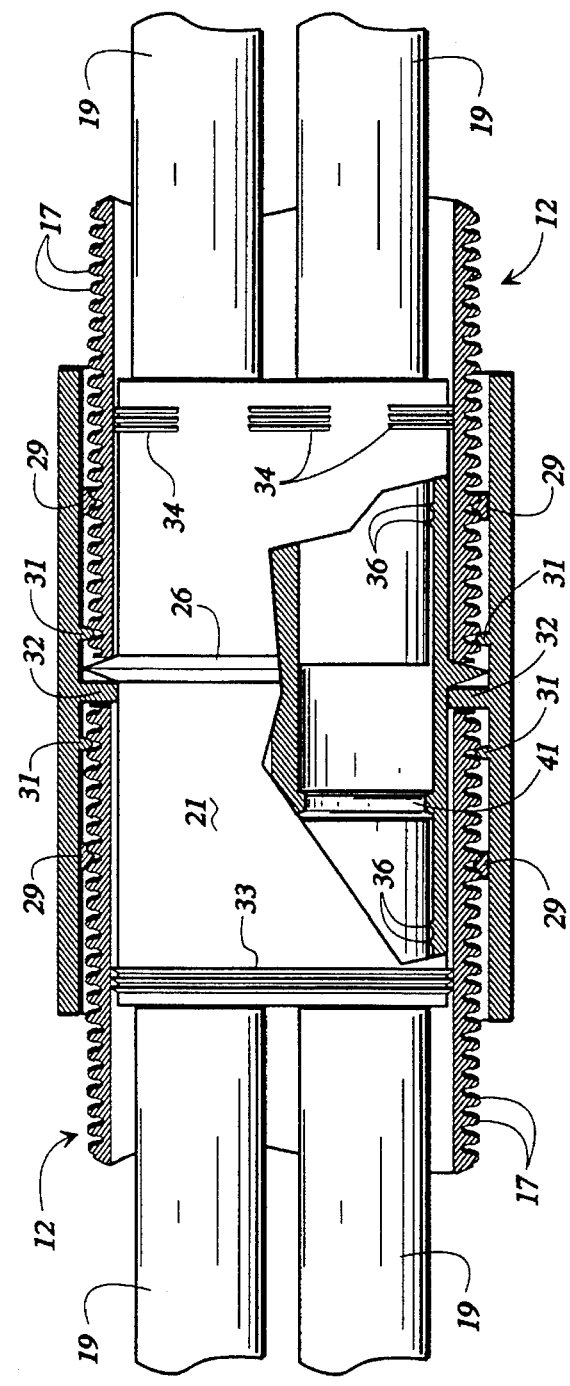
FIG. 3 is a partially sectional view of the ends of two joined sections of multi-duct, illustrating the configuration and placement of an inner duct coupler, outer casing coupler, and the exterior sealing gaskets for preventing intrusion of water into the system.
Figure 5:
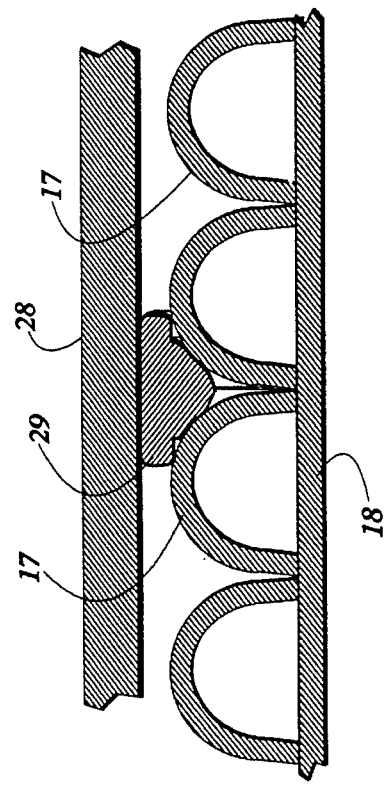
FIG. 5 is a close up sectional view illustrating a preferred configuration and placement of an outer casing sealing gasket for sealing the outer casing against leakage of moisture.

Each of the sections 12 comprises an elongated generally cylindrical outer casing 13 having a first end portion 14 and a second end portion 16. The outer casing 13 is formed with an exterior surface that is circumferentially corrugated to define a multitude of adjacent annular ridges 17 (FIG. 3). As best seen in FIG. 5, the outer casing 13 is also formed with an interior surface 18 that is substantially smooth and from which the corrugated exterior surface extends. As discussed in more detail below, the corrugated configuration of the outer casing provides superior crushing resistance to withstand the weight of dirt and fill in a trench while simultaneously allowing the outer casing to flex and bend about an arc as small as 10 feet in radius.

A plurality of flexible inner ducts 19 are disposed within and extend along the length of the outer casing 13 from its first end 14 to its second end 16. The inner ducts 19 are sized and configured to receive and house fiber optic cable that is drawn through the inner ducts when the system is fully assembled and installed in place in the field. While four inner ducts are illustrated in the drawings and represent a common configuration, the present invention is equally applicable to systems with any number of inner ducts. The inner ducts can be formed of PVC plastic if desired but preferably are made of polyethylene, which is more flexible and exhibits less sliding friction than PVC. To reduce further the friction between the inner ducts and fiber-optic cable as the cable is drawn through the system, the interior surface of the inner ducts can be formed with longitudinal, spiral, or circumferential ridges upon which the cable rides as it is pulled through the inner ducts.

A generally cylindrical inner duct coupler 21 is disposed within the first end 14 of the outer casing 13 and functions to align, couple, and seal the inner ducts of two conduit sections when the sections are joined together. The inner duct coupler 21 preferably is molded of a unitary piece of rubberized material such as, for example, Santoprene Thermoplastic Rubber from Montsanto. The coupler comprises a coupler body 22 having first and second end portions 23 and 24 respectively and a generally annular positioning flange 26 extending outwardly from the coupler body intermediate its ends. A plurality of circular bores 27 are formed in and extend longitudinally through the coupler body from its first end 23 to its second end 24 as best seen in FIG. 2.

The inner duct coupler 21 is inserted into the first end 14 of a conduit section 12 as shown in FIG. 1, with its annular positioning flange 26 abutting the end of the conduit section. The flange 26 insures that the coupler seats squarely and at the proper longitudinal position within the outer casing. In this way, the coupler's second end 24 extends into the casing and its first end 23 protrudes beyond the end of the casing. The ends of the inner ducts 19 within the outer casing 13 extend into the bores 27 at the second end portion 24 of the coupler to an annular stop 41 (FIG. 3) formed in the wall of the bore intermediate its ends. The bores at the first end portion 23 of the coupler are adapted to receive the inner ducts of the male end of a like conduit section when the sections are joined together end-to-end as illustrated by the arrows in FIG. 1. In this way, the inner ducts of adjacent conduit sections become aligned and coupled together within the longitudinal bores of the coupler 21 so that they form continuous passageways from one end of an assembled conduit assembly to the other end thereof.

As illustrated in FIG. 3, the inner ducts at the male end of an adjoining conduit section extend into the bores of the inner duct coupler to a position spaced from the annular stops 41 formed in the walls of the bores and thus spaced from the ends of the inner ducts to which they are coupled. The space between the ends of two aligned inner ducts forms an expansion region wherein the end of the duct spaced from the stop 41 can move slidably toward or away from the end of the duct with which it is aligned. In this way, when the conduit assembly is bent into an arc to negotiate a turn, the inner ducts on the inside of the arc can move in the expansion region toward their abutting inner ducts while those on the outside of the arc are free to move away from their abutting inner ducts. The expansion region thus accommodates relative movement of aligned inner duct ends so that the difference in circumference between the inside of the arc and the outside thereof is readily accommodated.

An outer casing coupler comprises a generally cylindrical rigid collar 28 that is mounted about the first end portion 14 of the outer casing 13 and extends beyond the end thereof to a position substantially aligned with the end of the protruding inner duct coupler 21. An inwardly extending annular flange 32 is provided at the mid-section of the collar 28 to position the collar properly on the end of the conduit section. In the preferred embodiment, the annular positioning flange 26 of the inner duct coupler 21 is captured between the end of outer casing 13 and the collar flange 32. The collar flange thus helps to align and hold the inner duct coupler securely in position within the conduit section 12. A first sealing gasket 29 is captured and compressed between the exterior surface of the outer casing 13 and the interior surface of the collar 28 to prevent intrusion or migration of moisture and other corrosive elements into the interior portions of the conduit system as described in more detail below.

The collar 28 in conjunction with the protruding end of the coupler 21 form a socket sized and configured to receive the male end portion 16 of a like conduit section for joining the two sections end-to-end in the field. The male end portion 16 is also provided with a sealing gasket 29 extending about the exterior casing and being secured between two adjacent ridges of the corrugated outer surface of the conduit. The ends of inner ducts 19 at the male end of each section protrude slightly beyond the end of their outer casing so that they can slide into the cylindrical bores of the coupler 21 to positions spaced from the internal stops 41 thereof (FIG. 3) when the conduit sections are joined together.

As two conduit sections are joined, the male end of one section is received into the female end of the other. More specifically, the end of the outer casing of the first section slides into the protruding collar of the second section such that the gasket 29 moves into the collar to seal off the junction of the outer casings against moisture intrusion. At the same time, each of the inner ducts of the first section slide into a corresponding bore of the coupler 21 thus becoming aligned with and coupled to an inner duct of the second section. Joined sections can then be bent about an arc if required, whereupon the ends of coupled inner ducts slide within their bores toward or away from each other as necessary to accommodate the bending of the conduit system as discussed above.

FIG. 3 illustrates two adjacent conduit sections coupled together at their ends according to principles of this invention. The cylindrical collar 28 is seen to extend about the end portions of the joined outer casings spanning the junction therebetween and joining the casings together. In the preferred embodiment, locking ribs 31 are provided around the interior surface of the collar 28. The ribs 31 are positioned to snap into place between the two ridges 17 at the end of each conduit section when the collar is pressed onto the conduits. Each of the conduit sections thus becomes locked securely in place by the locking ribs 31. The rib 31 on the right hand side of collar 28 as seen in FIG. 3 is space from the collar's flange 32 a distance sufficient to accommodate the width of the positioning flange 26 on the inner duct coupler. With this configuration, the rib 31 snaps into position locking the end of the right hand outer casing against the flange 26 and capturing the flange 26 between the end of the casing and the collar flange 32. The inner duct coupler is thus held securely and squarely within the outer casings to help prevent undesirable deformation of the coupler when the conduit assembly is bent.

A sealing gasket 29 is disposed and compressed between the exterior surface of each conduit section outer casing and the interior surface of the collar 28. In the preferred embodiment, the sealing gaskets 29 are configured to nestle between two adjacent ridges of the conduit sections exterior surface and to seat securely therein so that the gaskets are maintained by the ridges in their proper location and to form a tight seal between the outer casings and the gaskets. The sealing gaskets 29 provide a reliable seal of high integrity that prevents migration of water and other corrosive elements past the sealing gaskets and into any interior portion of the conduit assembly.

The inner duct coupler 21 extends into the end of each of the joined conduit sections as shown. A set of chevron seals 33 preferably are formed about at least one end portion of the coupler 21 to bear and seal against the interior surface of one of the conduit sections 12. The chevron seals 33 prevent migration of moisture from one conduit section to an adjacent section in the event that a conduit section is crushed or damaged. An array of circumferentially spaced chevron arrays 34 are positioned about the other end of the coupler 21 to bear against the interior surface of the adjacent conduit section and thus hold the inner duct coupler 21 securely in place within the end of the conduit section.

Figure 4:
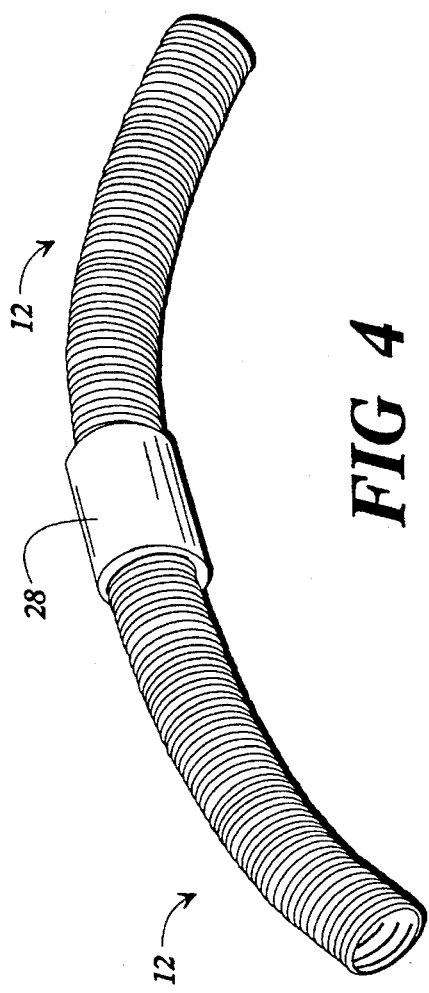

FIG. 4 illustrates the flexibility of the multi-duct conduit assembly of this invention to facilitate bending of the assembly around turns and corners often encountered when installing such assemblies in the field. As the assembly is bent about an arc, the corrugations of the outer casing tend to bunch together on the inside of the arc and spread apart on the outside of the arc. This accordion-like effect allows the outer casing to be bent to follow an arc as small as 10 feet in radius. Such an arc corresponds well to the radii of arcs about which multi-duct conduit must be extended to negotiate turns and bends commonly encountered in the field.

Naturally, as the assembly is bent around an arc, the inner ducts on the outside of the arc will follow a path slightly larger in radius than the inner ducts on the inside of the arc. The circumference defined by the outside ducts is therefore slightly longer than that defined by the inside ducts. For example, when a four inch conduit having four 1.5 inch inner ducts is bent into a circle having a 10 foot radius, the inner ducts on the outside of the circle will define a circumference some 14 inches longer than that defined by the inner ducts on the inside of the circle. Since the inner ducts cannot stretch, the outside ducts of adjacent sections must spread apart at their ends while the inside ducts of adjacent sections must move closer together at their ends. Such relative movement is accommodated by the configuration of the inner duct coupler of this invention, which provides an expansion region 42 (FIG. 3) between the ends of inner ducts to allow at least one of the ducts to slide longitudinally within its bore either toward or away from the duct with which it is aligned. The expansion region 42 is sized to accommodate relative movement of aligned inner duct ends as the conduit assembly is bent about its maximum arc.

As the inner ducts 19 move within the bores 27, ribs 36 and/or the walls of the bore 27 maintain their firm sealing grip on the moving inner ducts so that the inner duct junctions remain sealed as the assembly bends to prevent intrusion of moisture and escape of air pressure. In addition, the rigid collar 28, which tightly embraces adjacent outer casings, in conjunction with the inner duct coupler, which bears firmly against the interior walls of the outer casings, form a relatively inflexible region of the conduit at and on either side of the junctions between adjacent sections. Accordingly, as the conduit is bent, the inner duct couplers are maintained in a substantially rectilinear configuration. This insures that the couplers do not become deformed thus destroying the inner duct seals as the conduit assembly is bent to accommodate corners and turns. This aspect of the assembly is further enhanced by the locking ribs 31, which maintain adjacent outer casing ends in spaced juxtaposed relationship and prevents them from becoming cocked relative to each other as the conduit assembly flexes.

FIG. 5 illustrates in detail the sealing gaskets 29 that function to prevent ingress of moisture into any part of the exterior casing. The sealing gasket 29 is contoured to nestle securely within the valley between two adjacent ridges 17 of the corrugated outer casing. In this way, the sealing gasket, when compressed by the collar 28, bears tightly against both of the ridges 17, thus providing a highly reliable barrier against intrusion of any moisture between the gasket and the exterior surface of the outer casing. The outer surface of the sealing gasket 29 bears firmly against the interior surface of the collar 28, which compresses the gasket 29 tightly into the valley between the ridges 17. The gasket 29 thus seats tightly against both the ridges and the interior surface of the collar 28 providing a reliable water tight seal. The ridges 17 also function to maintain the gasket 29 in its proper position around the outer casing as male ends of sections are slipped into female ends of abutting sections. This prevents bunching up or rolling of the gaskets commonly encountered in prior art systems and insures a highly reliable seal at the junction of each pair of adjacent conduit sections.

Figure 6:
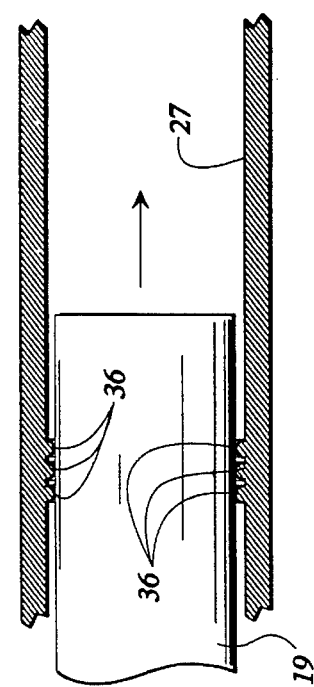
FIG. 6 is a partially sectional view illustrating a preferred configuration of one of the inner coupler bores for receiving, aligning, and sealing the inner ducts of the system.

FIG. 6 illustrates a preferred configuration for sealing the inner ducts 19 within the bores 27 of the coupler 21. Specifically, the bores preferably are formed with slightly tapered interior walls that tightly embrace and seal against the inner ducts 19 in surface-to-surface sealing contact as they move into the bores 27. In addition, an array of annular ribs 36 extend about the interior surface of each bore to engage the inner duct 19 firmly thus further sealing it against ingress of moisture and escape of air pressure. The seals between the bores 27 and the inner ducts 19 insure that should one of the outer casings be cracked or damaged thus leaking water into the space surrounding the inner ducts, the water is prevented from migrating further into the inner ducts by the sealed relationship between each inner duct and the interior surface of its bore. In addition, the sealed junction between the inner ducts of two joined conduit sections prevents loss of air pressure when blowing a projectile and pulling tape through the ducts in preparation for drawing cable therethrough. This allows longer runs of conduit to be blown, thus saving time and money.

The invention has been described above in terms of a preferred embodiment. However, it will be obvious to those of skill in this art that numerous variations of the illustrated embodiment may be implemented within the scope of the invention. For example, while the outer casing coupler has been illustrated as a separate collar that fits about the ends of two adjacent casings, it might also be formed as an integral piece of each conduit section as with the bell end of a PVC pipe. Also, while corrugated outer casing has been illustrated as the preferred configuration to provide flexibility as well as strength, other outer casing designs including thin-walled outer casings with internal buttresses might also provide the flexibility and strength required in applications of this invention. Further, the outer casing coupler and exterior sealing gaskets in conjunction with a rubberized inner duct coupler may well be employed successfully with a rigid non-flexible conduit system to prevent intrusion of water into any interior portion of the system. To this extent, therefore, this invention is not limited to flexible conduit systems only. These and other modifications, additions, and deletions might be made to the illustrated embodiment without departing from the spirit and scope of the invention as set forth in the claims.

I claim:

1. A flexible multi-duct conduit assembly for housing subterranean communications lines and protecting the lines from underground moisture and other corrosive elements, said conduit assembly comprising:

a plurality of conduit sections joinable end-to-end with each conduit section comprising an elongated open ended outer casing having a plurality of open-ended flexible inner ducts disposed within and extending along the length of said outer casing;

said outer casings having an interior surface and a circumferentially corrugated exterior surface to provide flexibility of said outer casings for bending the casings about an arc;

means for coupling said outer casings together in mutually aligned end-to-end relationship comprising a collar surrounding and spanning the intersection between the aligned ends of adjacent outer casings;

coupler means disposed within said outer casings at the junctions of adjacent conduit sections for aligning and coupling together the inner ducts to form continuous passageways extending along the length of said conduit assembly for receiving and housing communications lines; and at least one gasket at the junction between each conduit section and an adjacent joined conduit section, said gasket surrounding the end of at least one of said outer casings and being captured and compressed between said outer casing and said collar, said gasket being configured to nestle and be compressed between two adjacent corrugations of said outer casing to confine said gasket to its proper position on said outer casing and to provide a reliable water-tight seal against migration of water into any portion of said outer casing.

2. The conduit assembly of claim 1 and further comprising first sealing means for sealing said coupler means against the interior surface of at least one of the outer casings spanned by the coupler means for inhibiting migration of moisture from the interior of one outer casing to the interior of an adjacent outer casing.

3. The conduit assembly of claim 2 and wherein said interior surface of each of said outer casings is substantially smooth and wherein said sealing means comprises a gasket surrounding said coupler means and being disposed and compressed between said coupler means and the interior surface of said outer casing.

4. The conduit assembly of claim 1 and further comprising locking means for locking and securing the aligned ends of adjacent outer casings in position within said collar and maintaining the aligned ends in fixed substantially juxtaposed relationship relative to each other.

5. The conduit assembly of claim 4 and wherein said locking means comprises at least one inwardly protruding rib formed about the interior of said collar with said rib being configured and positioned to rest between two adjacent corrugations on the end of said outer casing when said collar is installed on said casing to lock the end of the outer casing in position within said collar.

6. The conduit assembly of claim 1 and wherein said coupler means is formed with a plurality of longitudinal bores for receiving and aligning corresponding ends of the inner ducts of the joined sections, said bores being sized and configured to provide an expansion chamber between inner duct ends to allow the ends to move toward and away from each other within their respective bores as the assembly is bent about an arc.

7. The conduit assembly of claim 6 and further comprising second sealing means for sealing said inner ducts against their respective bores to prevent migration of water into said inner ducts at their coupled together junctions.

\* \* \* \* \*